United States Patent

Taguchi et al.

[11] Patent Number: 6,009,088
[45] Date of Patent: Dec. 28, 1999

[54] MOBILE WIRELESS DATA COMMUNICATIONS SYSTEM

[75] Inventors: Tsutomu Taguchi; Shinji Kobayashi; Yoshiki Fujima; Kazushige Tanaka, all of Yokohama; Masahiko Hirono, Kanagawa, all of Japan

[73] Assignee: NTT Mobile Communications Network, Inc., Japan

[21] Appl. No.: 08/875,510

[22] PCT Filed: Dec. 20, 1996

[86] PCT No.: PCT/JP96/03724

§ 371 Date: Jul. 29, 1997

§ 102(e) Date: Jul. 29, 1997

[87] PCT Pub. No.: WO97/23977

PCT Pub. Date: Jul. 3, 1997

[30] Foreign Application Priority Data

Dec. 26, 1995 [JP] Japan ................................. 7-339664

[51] Int. Cl.[6] .............................. H04Q 7/24; H04L 12/28; H01S 4/00
[52] U.S. Cl. ........................... 370/338; 370/401; 455/445
[58] Field of Search .................................... 370/338, 328, 370/349, 401, 329, 352, 356; 455/445, 560, 462, 465

[56] References Cited

U.S. PATENT DOCUMENTS 5,726,984  3/1998  Kubler et al. ........................... 370/338

*Primary Examiner*—Chi H. Pham
*Assistant Examiner*—Afsar Qureshi
*Attorney, Agent, or Firm*—Rogers & Wells LLP

[57] ABSTRACT

In order for the user to perform a transmission of packet data to a desired communication counterpart on a virtual network across a wireless circuit exchange type network system and a LAN without being bothered by address exchange between an address of a physical network and an address of a virtual network, an exchange (10*a*) performs an address exchange necessary for establishing a communication channel between the terminal equipments within the system using a conversion table, in a mobile wireless data communication system in which a wireless circuit type network system comprising a wireless mobile station (30*a*), a wireless connection equipment (20*a*) and the exchange (10*a*) is connected to a LAN (40*a*) through a TA (60*a*) and a router (50*a*).

6 Claims, 16 Drawing Sheets

MOBILE WIRELESS DATA COMMUNICATIONS SYSTEM

TECHNICAL FIELD

This invention relates to a mobile wireless data communications system capable of transmitting packet data between the data communication terminal equipments in a virtual network across a mobile communications network and a LAN.

TECHNICAL BACKGROUND

The progress of a recent wireless technology is remarkable. Even if it is limited to a private usage, the technology for making the indoor telephone fully wireless became a reality with the use of a PBX private branch exchange) system, etc., based on the technique for personal communications which is a result of the development of cordless telephones. Moreover, a wireless LAN (local area network) is widely practiced also in the field of data communications. This LAN undertakes a role for making offices and the like wireless.

In the wireless PBX, mobility, as well as wireless of telephones, was pursued. That is, a movement in the wireless area under the control of a single PBX is made possible as a matter of course, and in addition, even a movement across between PBX is also made possible by the automatic position registration, without compelling the user a useless registration change (or, transmitting an incoming signal, etc.). This technology is often referred to as "loaming between PBX". In principle, it realizes a possibility of endless movement even within the private branch. Moreover, a PBX added-service based on the use of the PBX which mostly uses the voice is realized in an almost perfect shape with the realization of this mobility.

On the other hand, recently, needs to a telephoneless communication as represented by e-mail have been increasing. This telephoneless communication method includes a method for performing a communication through a telephone line (channel exchange) and a method for performing a communication from a terminal equipment accommodated within the LAN. Needless to say, the method using the LAN is chiefly employed in recent offices. In addition, the appearance of the Internet is spurring the popularization of this LAN further. Now, the technology of the Internet is briefly described.

The Internet is one embodied form of a virtual network which aims at performing worldwide communications across the various physical networks represented by LAN such as Ethernet, essentially satisfying the following items.

(a) The network principle of the Internet is to realize a virtual network and not to specify a form of realization of a physical network.

(b) The Internet address does not obligate the existence of a switching node which performs the switching intensively. On the other hand, it is necessary for the terminal equipment to be fixed to the physical network.

In order to perform a routing between the terminal equipments across the various physical networks, it is necessary that the terminal equipments are uniquely identified in the world. Concretely, it is necessary that a connection point with the physical network where the specific terminal equipment is accommodated is uniquely identified in the world. In the Internet, therefore, an address called "IP (Internet Protocol) address" is assigned to each terminal equipment based on a common system in the world, and the routing is performed based on this Internet Protocol address.

The wireless PBX chiefly comprising the channel exchange and the Internet based on the LAN were explained hereinbefore. The former is becoming main communication means in offices by adding mobility thereto, and the latter is becoming main communication means for data communications. It seams that importance of those communication means will rise more and more as a basic structure for supporting activities in offices in the future.

By the way, in the virtual network across the wireless PBX and the LAN, the data communication terminal equipment, which is under the control of the wireless PBX, occasionally transmits packet data. In such occasions, a communication channel in the wireless PBX system was established by signal outputted from the telephone (personal station) connected to the data communication terminal equipment, and a data communication was performed via the LAN. That is, the role to make the address on the virtual network and the address (in this case, telephone number) on the physical network correspond to each other was played by man as an addresser of the data. Therefore, the operation was troublesome.

DISCLOSURE OF INVENTION

This invention was accomplished in view of the above-mentioned circumstances. It is, therefore, an object of the present invention to provide a mobile wireless data communications system, in which an address system of a physical network and an address system on a virtual network are made correspond to each other so that a routing of packet data is automatically performed to thereby transmit data in a data communication on a virtual network across a wireless line exchange type network system and a LAN.

In order to achieve this object, a mobile wireless data communications system according to the present invention comprises a wireless personal station assigned with a telephone number in accordance with a single telephone number scheme, a wireless connection equipment for performing a wireless connection with the wireless personal station, an exchange for controlling the wireless connection equipment, a control unit connected to the exchange and adapted to perform a transmission control of packet data through the LAN, and a terminal equipment connected to the LAN and assigned with a packet address independent of the telephone number scheme, the exchange performing a routing based on the telephone number, the control unit performing a transmission control of the packet data based on the packet address, characterized in that the exchange has a correspondence table in which the packet address is made correspond to the telephone number, and the packet address is converted to the telephone number based on the correspondence table in order to establish a communication channel between the wireless personal station and the terminal equipment connected to the LAN.

According to the present invention, since the address on the physical network and the address on the virtual network are automatically converted to each other on the virtual network across the wireless line exchange type network system and the LAN, a packet data can be transmitted to a desired communication counterpart without being annoyed by such address conversion.

In such a configuration as mentioned above, instead of making the exchange have a correspondence table, the wireless personal station may have a correspondence table in which the packet address is made correspond to the telephone number, and may convert the packet address to the telephone number based on the correspondence table in order to establish a communication channel between the wireless personal station and the terminal equipment connected to the LAN.

Also, instead of making the exchange have a correspondence table, the control unit may have a correspondence table in which the packet address is made correspond to the telephone number, and may convert the packet address to the telephone number based on the correspondence table in order to establish a communication channel between the wireless personal station and the terminal equipment connected to the LAN.

Next, in order to achieve the above object, a mobile wireless data communications system according to the present invention comprises a plurality of systems each comprising a wireless personal station assigned with a telephone number in accordance with a single telephone number scheme, a wireless connection equipment for performing a wireless connection with the wireless personal station, an exchange for controlling the wireless connection equipment, a control unit connected to the exchange and adapted to perform a transmission control of packet data through the LAN, and a terminal equipment connected to the LAN and assigned with a packet address independent of the telephone number scheme, the exchange performing a routing based on the telephone number, the control unit performing a transmission control of the packet data based on the packet address, characterized in that the exchanges of the systems are connected together and the control units of the systems are also connected together, the wireless personal station of each system is capable of communicating with a control unit in a desired system through a wireless connection equipment and an exchange not only within its own system but also within other system, the exchange has a correspondence table in which the packet address is made correspond to the telephone number, and the packet address is converted to the telephone number based on the correspondence table in order to establish a communication channel between the wireless personal station and the terminal equipment connected to the LAN.

In such a configuration as mentioned above, instead of making the exchange have a correspondence table, the wireless personal station may have a correspondence table in which the packet address is made correspond to the telephone number, and may convert the packet address to the telephone number based on the correspondence table in order to establish a communication channel between the wireless personal station and the terminal equipment connected to the LAN.

Also, instead of making the exchange have a correspondence table, the control unit may have a correspondence table in which the packet address is made correspond to the telephone number, and may convert the packet address to the telephone number based on the correspondence table in order to establish a communication channel between the wireless personal station and the terminal equipment connected to the LAN.

BEST MODE FOR CARRYING OUT THE INVENTION

The best mode for carrying out the present invention will now be described in detail.

1: First Embodiment

First of all, the first embodiment of the present invention is described. In this embodiment, the present invention is applied to an in-house communications system having a wireless PBX system and a LAN connected to the wireless PBX system and in which a routing is performed using the IP as a communication protocol.

1-1: Configuration of First Embodiment

Figure 1:
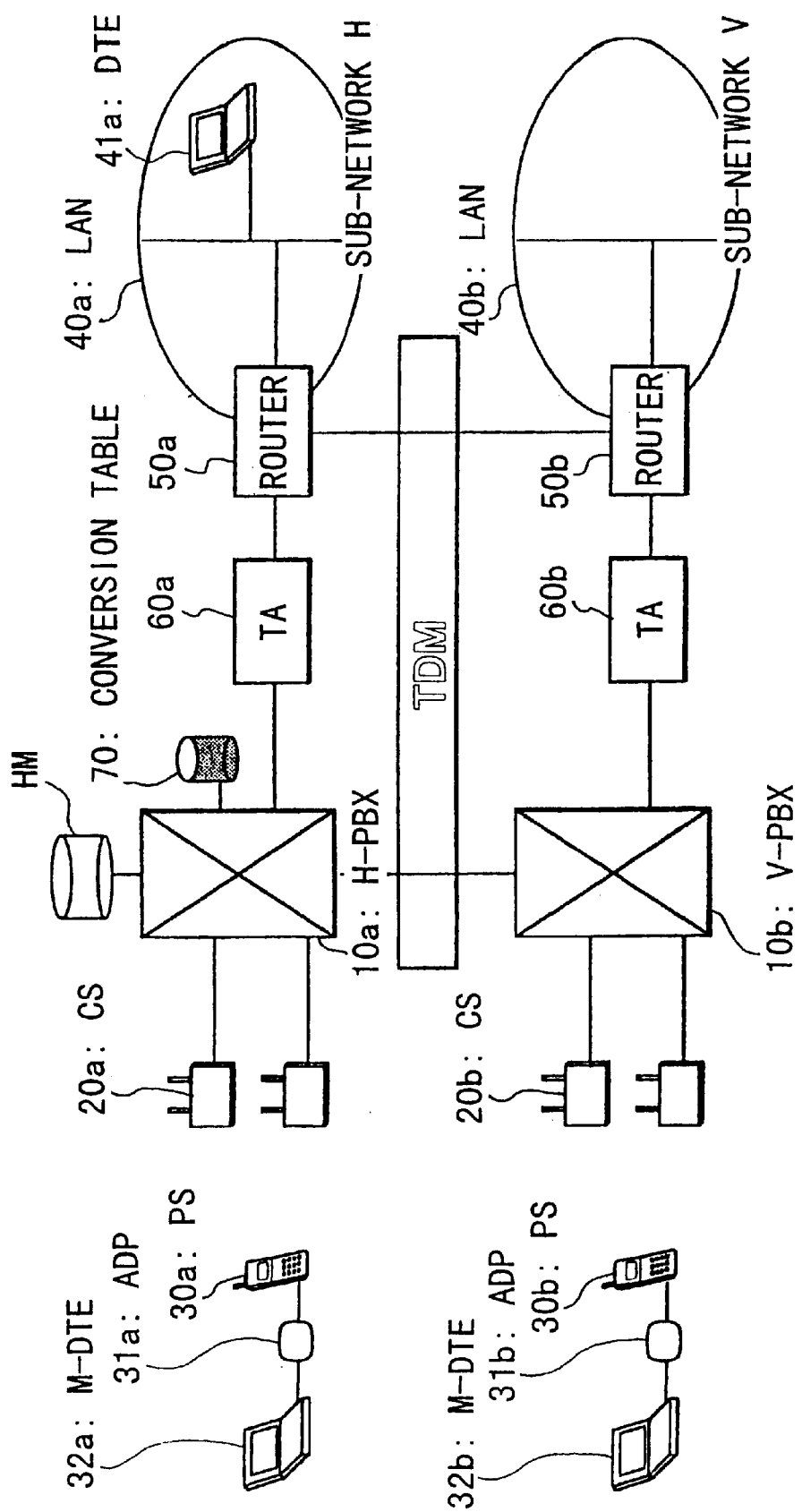
FIG. 1 is a diagram showing a configuration of the first embodiment of the present invention.

A configuration of the first embodiment is illustrated in FIG. 1. As shown in this Figure, the wireless PBX system among many in-house communication systems comprises a PBX, a CS (Cell Station), and a PS (Personal Station). In the configuration of FIG. 1, reference numerals 10a and 10b denote the PBX; 20a and 20b, the CS; and 30a and 30b, the PS, respectively.

Here, the PBX 10a and 10b each comprise a control portion, a switching portion, a base band processing portion, a memory for storing initial registration data of the PS which is under the control of the PBX 10a, 10b, and some others. The PBX 10a and 10b have the functions for controlling the overall system, exchanging the channel of data flowing on the communication channel, coding voices, exchanging the channel while a communication is going on, verifying the PS, registering the location of the PS, loaming for a communication which the PS performs while moving between different PBX.

In case the PBS where the initial registration data of the PS are present is assumed to be a home PBX (H-PBX) of its PS and the PBX of its next visiting place is assumed to be a visitor PBX (V-PBX), a loaming is performed by connecting the call with reference to the location registration data of the PS stored in the memory of the H-PBX when data are sent to or received by the PS which is currently present in the wireless area of the V-PBX. In the example of FIG. 1, the PBX 10a is the H-PBX and the PBX 10b is the V-PBX both for the PS 30a. HM denotes a home memory within the H-PBX which stores therein the location registration data. In order to send and receive the control data necessary for loaming, the PBX are connected together by ISDN (Integrated Services Digital Network) multiplexed by TDM (Time Division Multiple access) or a private channel.

The CS 20a and 20b each comprise a wireless portion (modulation and demodulation portion), and a pair of PBX interface portions. The CS 20a and 20b are connected respectively to the PBX through a wired special purpose interface, and transmit control signal and data between the PBX and the PS through a wireless section (radio section).

The PS 30a and 30b each comprise a wireless portion (modulation and demodulation portion), a base band processing portion, an external terminal equipment interface portion, etc. The PS 30a and 30b perform a sending/receiving of signal, voice-coding, etc. for voice and data communications. In case the data communication is performed, the PS 30a and 30b are connected to DTE (Data Terminal Equipment) having a serial interface such as RS232C to transmit a control signal, data, etc. from the DTE through the wireless section.

LAN 40a and 40b use the Ethernet as a physical medium, comprising sub-networks which are divided by routers 50a and 50b for performing a routing of IC packets. The LAN 40a and 40b may use other medium than the Ethernet. Each sub-network is connected to the PBX 10a or 10b within the wireless PBX system through the router 50a or 50b and a TA (Terminal Adapter) 60a or 60b. The TA 60a and 60b each comprise a protocol conversion portion, an interface portion, and the like. The TA 60a and 60b are connected together through the PBX, ISDN or a special purpose interface. The TA 60a and 60b perform the sending and receiving of signal and the terminating of protocol. The routers and the TA have the role which a control unit has, for controlling the transmission of packet data through the LAN.

In this embodiment, a communication can be performed between one DTE on the LAN side and other DTE on the wireless PBX system side. In the example of FIG. 1, the LAN 40a is connected with a DTE 41a, and M-DTE (Mobile Data Terminal Equipment) 32a and 32b are present on the wireless BPX system side.

The M-DTE and DTE each include a personal computer, so-called PDA (Personal Digital Assistant), and the like. They serve as a communication protocol for supporting TCP/IP (Transmission Control Protocol/Internet Protocol). The M-DTE 32a and 32b are connected respectively to ADP (Adapters) 31a and 31b through a serial interface, and the ADP 31a and 31b are connected respectively to the PS 30a and 30b through a serial interface. The ADP 31a and 31b each comprise a protocol conversion portion, an interface portion, and the like. The ADP 31a and 31b perform the terminating of the protocol. The M-DTE, ADP and PS may be designed such that they are theoretically separate but physically integral.

In order to perform a data communication between the M-DTE and the DTE or M-DTE, it is necessary to make an address (IP address) used in an IP layer correspond to an address (Ethernet address in the LAN, and extension number in the wireless PBX system) used in a lower physical layer than the IP layer. In general, the LAN is a connectionless type network, in which a node (in general, a router) for relaying an IP package exchanges the IP address for the Ethernet address, and performs a relay transmission of the IP packet.

On the other hand, the wireless PBX system is a connection type network which establishes an end-to-end physical link through the PBX and performs a communication by channel exchange. Here, in case the IP address is not identical with the physical address, it is necessary to prepare a table (conversion table) for making the former correspond to the latter. With the use of the conversion table, a physical link is established and the IP packet is transmitted on it. In this embodiment, a conversion table 70 for performing this conversion function is provided on the H-PBX.

1-2: Operation of First Embodiment

Operation of this embodiment will now be described.

Figure 2:
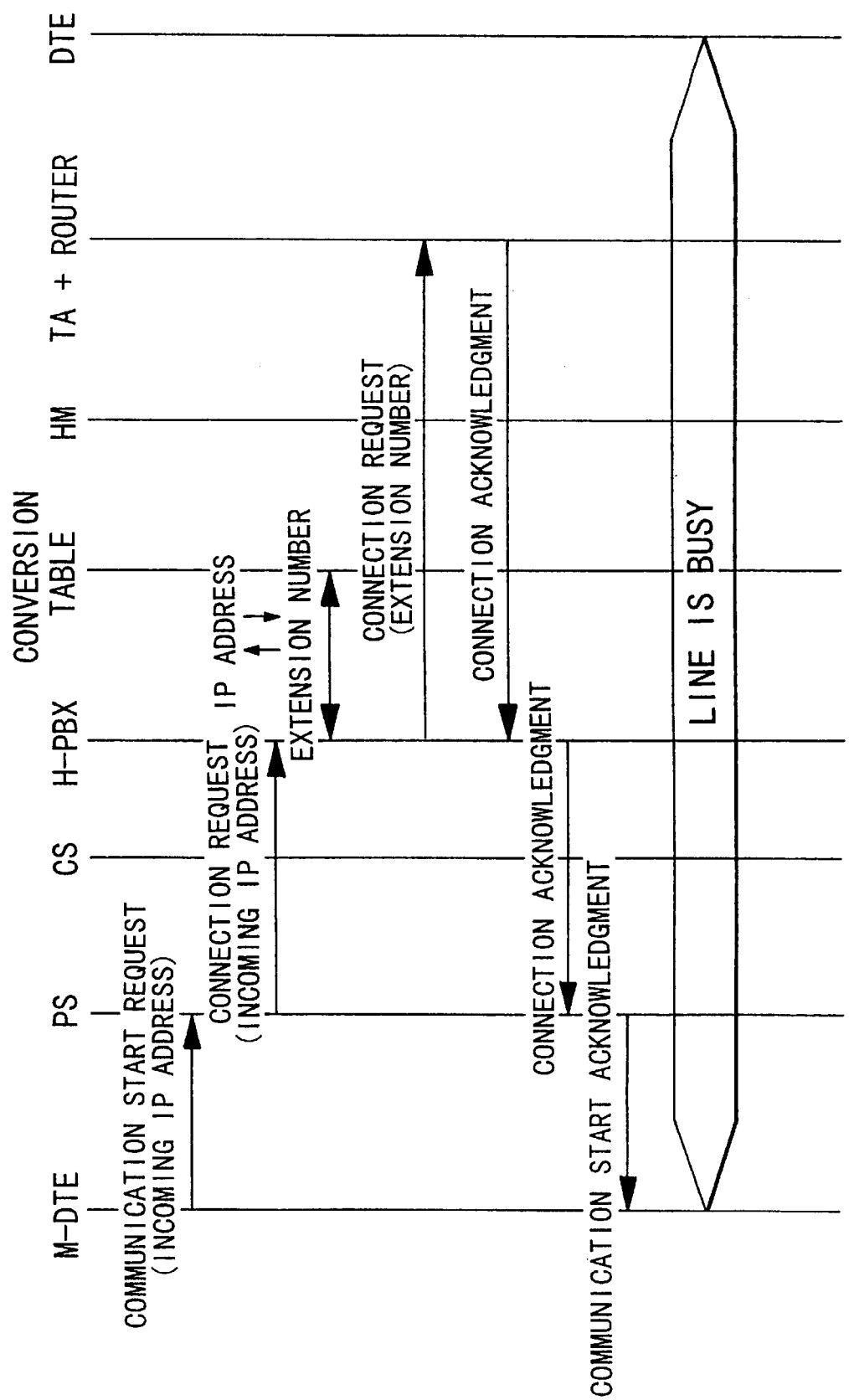
FIG. 2 is a connection sequence diagram showing the operation of the above embodiment.

1-2-1: In Case Communication Is Performed Between M-DTE and DTE Under the Control of H-PBX A connection procedure for sending data from a certain M-DTE to a DTE within the LAN is described first with reference to a connection sequence diagram of FIG. 2.

In the first step, the M-DTE sends a communication start request to the PS. At that time, the M-DTE simultaneously notifies the PS of an incoming IP address indicative of a DTE as the addressee. Recognizing that the call is for the data communication, the PS sends a connection request designating an IP/extension number conversion connection special number (special number) requesting a conversion from the IP to an extension number to the H-PBX. At that time, the above connection request includes the incoming IP address so that the request can be distinguished from a connection request for voice communication.

Receiving the special number for IP/extension number conversion connection from the PS and recognizing it as a call for data communication, the H-PBX converts the incoming IP address included in the connection request to an extension number using the conversion table and sends a connection request to the TA corresponding to this extension number. In this case, the H-PBX may send the connection request directly and unconditionally to the TA without referring to the incoming IP address information contained in the conversion table.

In response to the connection request from the H-PBX, the TA sends a connection acknowledgment and establishes a communication channel between the PS and the TA through the H-PBX. Thereafter, the M-DTE communicates with the DTE through the router connected to the LAN.

1-2-2: In Case One M-DTE Sends Data to Other M-DTE

Figure 3:
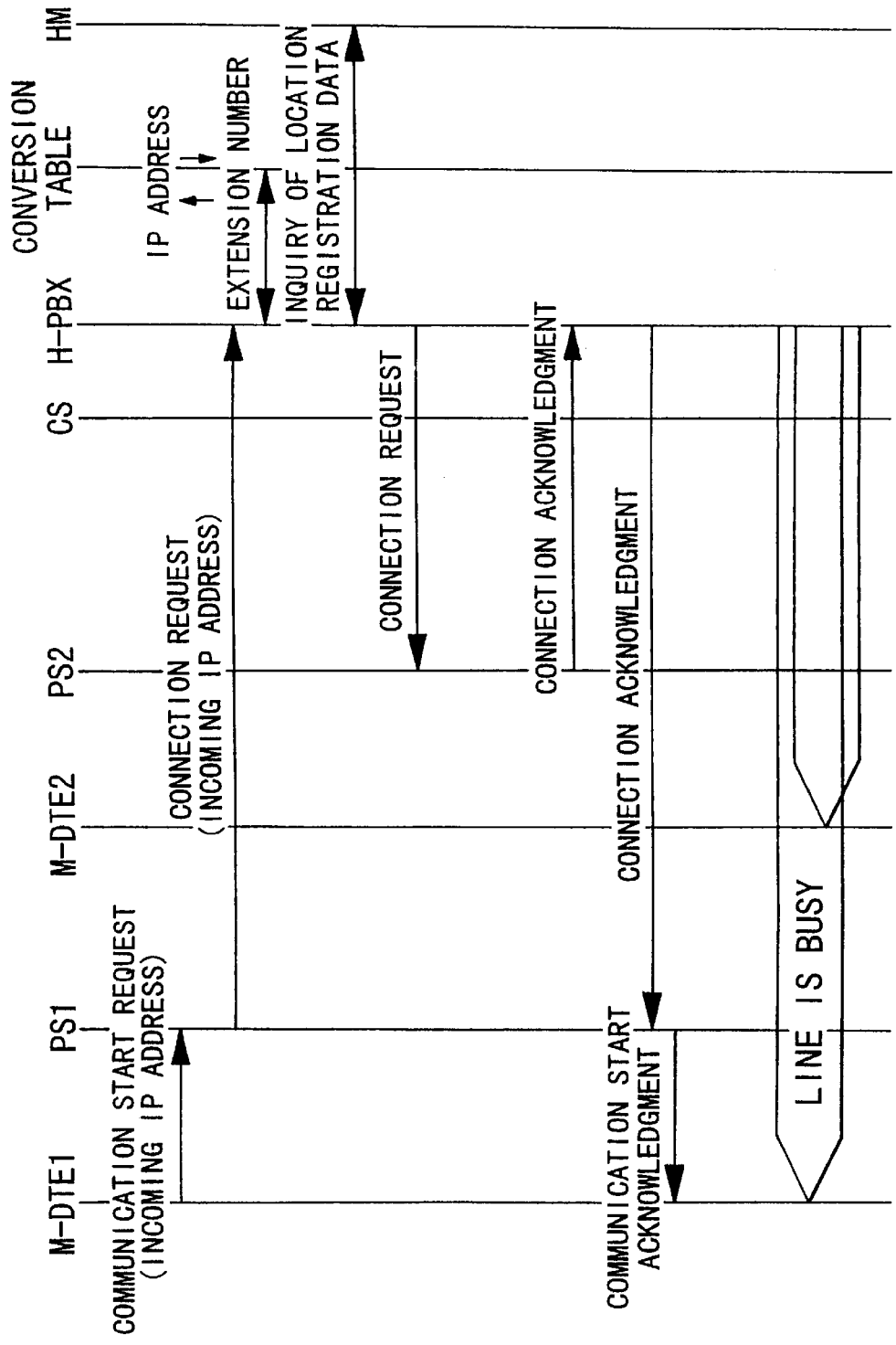
FIG. 3 is a connection sequence diagram showing the operation of the above embodiment.

With reference to FIG. 3, a connection procedure for the M-DTE 1 under the control of the H-PBX to communicate with other M-DTE is described first.

In the first step, the M-DTE 1 sends a communication start request to the PS 1. At that time, the M-DTE 1 simultaneously notifies the PS 1 of an incoming IP address indicative of a M-DTE 2 as the addressee. Recognizing that the call is for data communication, the PS 1 sends a connection request designating an IP/extension number conversion connection special number (special number) requesting a conversion from the IP to an extension number to the H-PBX.

Receiving the special number for the IP/extension number conversion connection from the PS 1 and recognizing it as a call for data communication, the H-PBX converts the incoming IP address included in the connection request to an extension number using the conversion table. Finishing the conversion to the extension number, the H-PBX accesses a home memory HM within the H-PBX which stores the location registration data and confirms which PBX the PS, for example, PS 2 as the addressee corresponding to the specific extension number is under the control of. Confirming that the PS 2 is under the control of the H-PBX, the H-PBX sends a connection request to the PS 2. Thereafter, a connection acknowledgment from the PS 2 as the addressee is sent to the PS 1 as the addresser. As a consequence, a communication channel is established between the PS 1 and the PS 2 through the H-PBX and a communication is performed between the M-DTE 1 and M-DTE 2.

Figure 4:
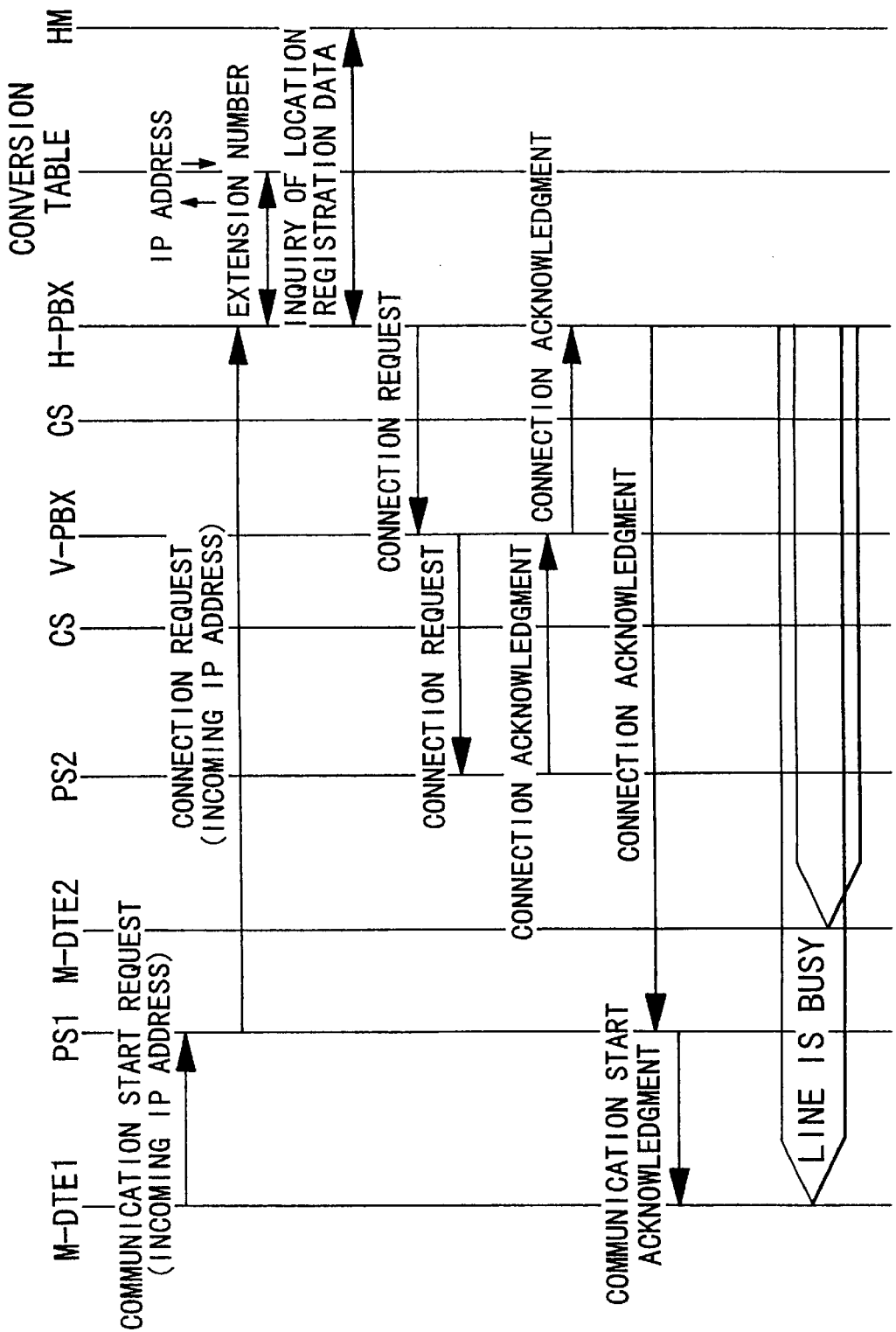
FIG. 4 is a connection sequence diagram showing the operation of the above embodiment.

The connection procedure described above is used for the case where both the PS 1 and PS 2 are under the control of the same PBX (H-PBX in the above example). In case the PS 2 as the addressee for the PS 1 is under the control of other PBX, namely, V-PBX than the H-PBX, the loaming function is used. A connection sequence for that occasion is shown in FIG. 4. In this case, in addition to the connection sequence of FIG. 3, a procedure for establishing a communication channel between the H-PBX and the V-PBX through a multiplex channel is needed.

More specifically, in this case, after receiving a connection request from the PS 1 and finishing the conversion of the incoming IP address to an extension number, the H-PBX accesses the home memory HM and confirms that the PS (PS 2) corresponding to the extension number is under the control of other PBX, namely V-PBX. As a consequence, control data are sent and received between the H-PBX and V-PBX through a multiplex channel, and a communication channel is established between the PS 1 and PS 2. This makes it possible for the PS 1 to communicate also with the PS 2 as a different PBX from the H-PBX which is under its own control.

1-2-3: In Case Data are Sent From DTE to M-DTE

Figure 5:
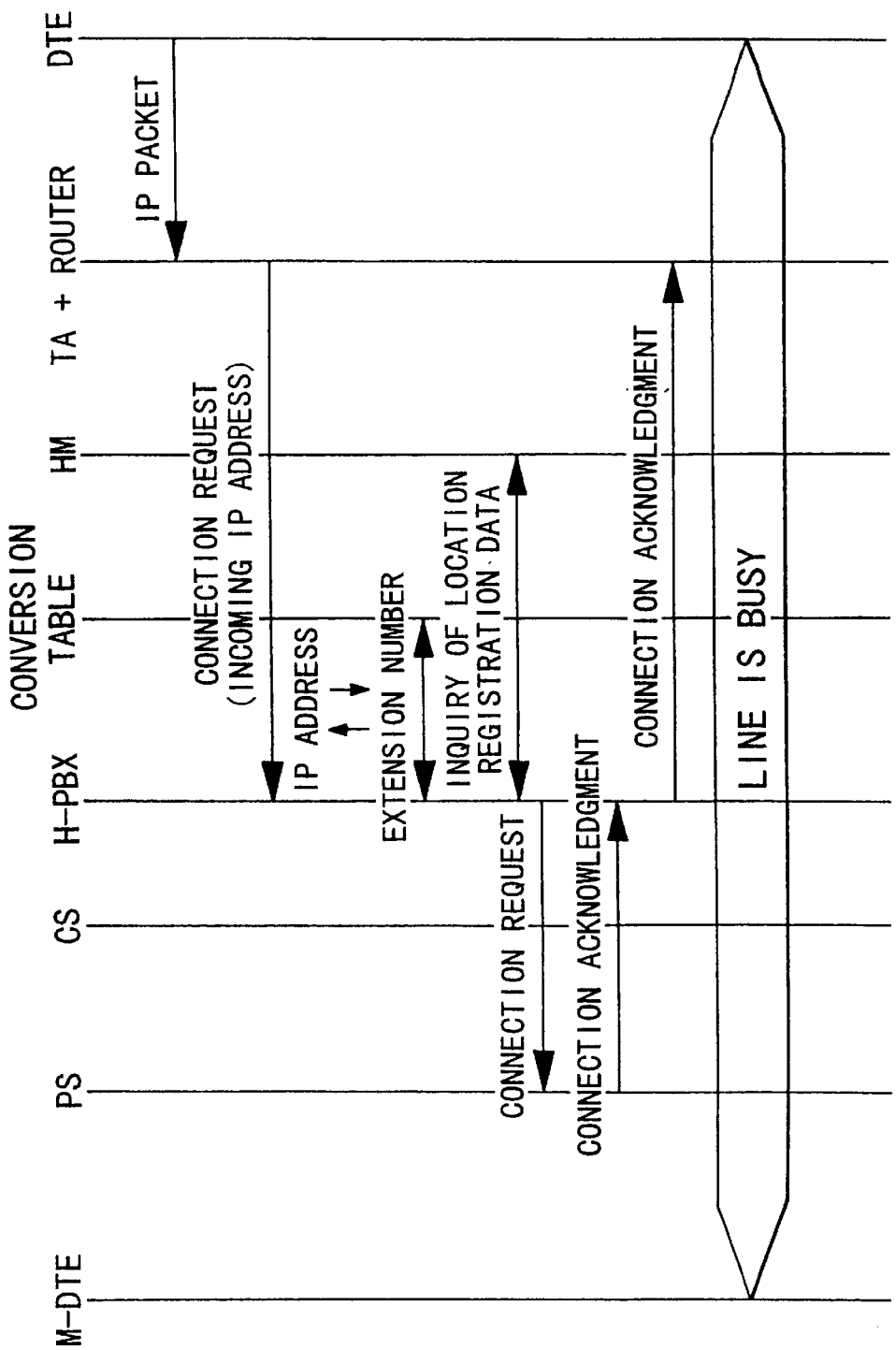
FIG. 5 is a connection sequence diagram showing the operation of the above embodiment.

With reference to a connection sequence diagram of FIG. 5, a connection procedure for sending data from the DTE to the M-DTE is described next.

When the router connected to the H-PBX through the TA receives an IP packet from the DTE to be addressed to the M-DTE, it sends a request to the TA requesting the TA to send the IP packet to the special number of the H-PBX, judging that the addressee of the packet is the H-PBX. At that time, an incoming IP address corresponding to the M-DTE as the addressee is simultaneously informed. In response to the request from the router, the TA sends a connection request designating an IP/extension number conversion connection special number (special number) of the H-PBX. At that time, an incoming IP address is included in the connection request.

Receiving the connection request from the TA with the special number and recognizing it as a call for data communication, the H-PBX converts the incoming IP address included in the connection request to its corresponding extension number using the conversion table. Then, the H-PBX accesses the home memory HM and confirms which PBX the PS corresponding to the specific extension number is under the control of. Confirming that the PS is under the control of the H-PBX, the H-PBX sends a connection request to the PS as the addressee. The PS as the addressee sends a connection acknowledgment in response to the connection request from the H-PBX. As a consequence, a communication channel is established between the PS and the TA through the PBX. Thereafter, the DTE communicates with the M-DTE through the router connected to the LAN.

In case the PS as the addressee is under the control of the V-PBX, a communication channel is established between the H-PBX and the V-PBX through a multiplex channel, using the loaming function. This makes it possible for the DTE to communicate also with the PS which is under the control of other V-PBX than the H-PBX which is under its own control.

2: Second Embodiment

Next, the second embodiment of the present invention is described.

2-1: Configuration of Second Embodiment

Figure 6:
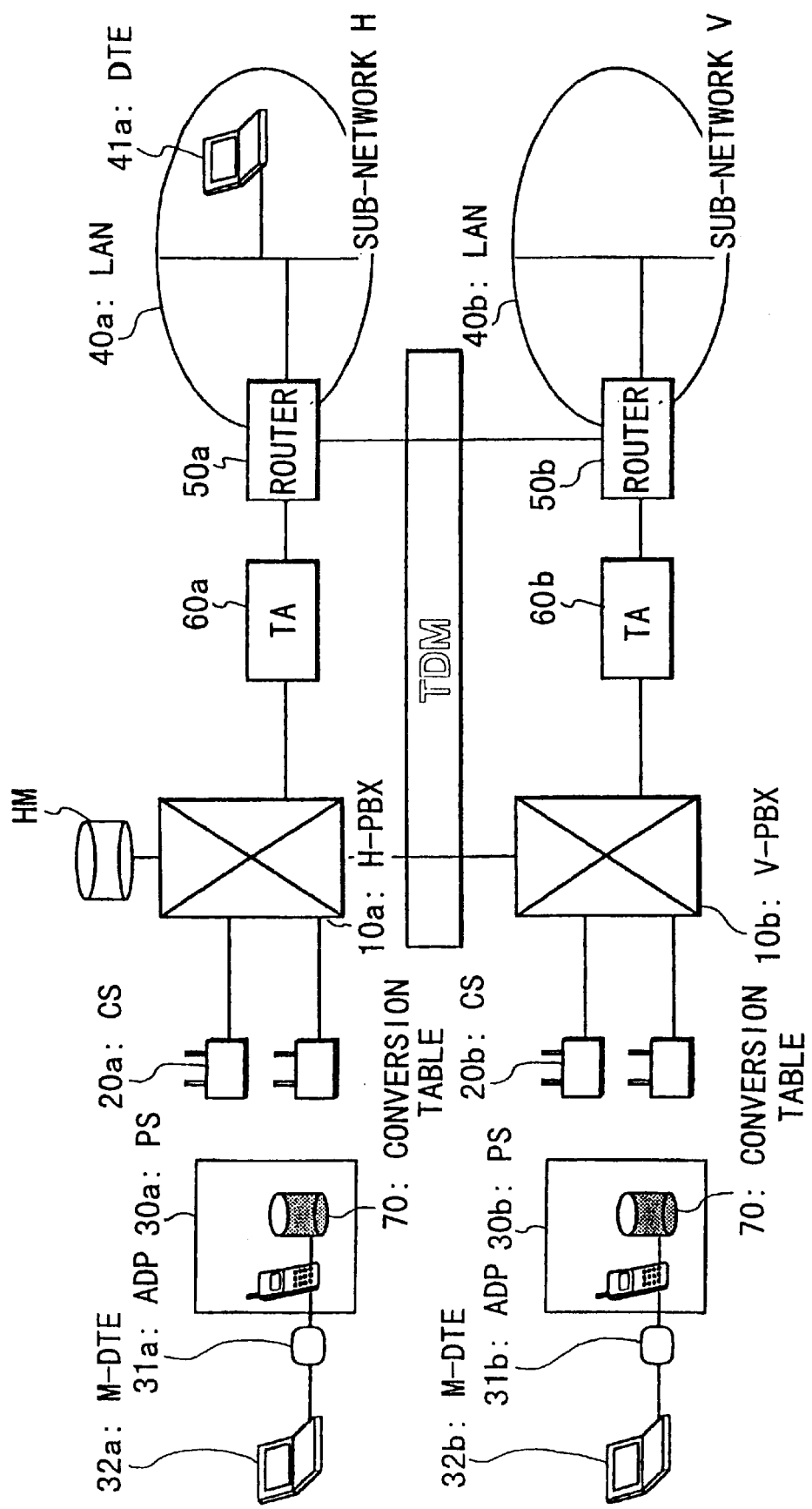
FIG. 6 is a diagram showing a configuration of the second embodiment of the present invention.

FIG. 6 illustrates a configuration of this second embodiment. This embodiment is different from the first embodiment only in the respect that the conversion tables for converting the IP address of the addressee to a physical address (extension number) are each provided on each PS 30*a*, 30*b*.

2-2: Operation of Second Embodiment

Operation of this embodiment will now be described.

2-2-1: In Case Data are Sent from M-DTE to DTE

Figure 7:
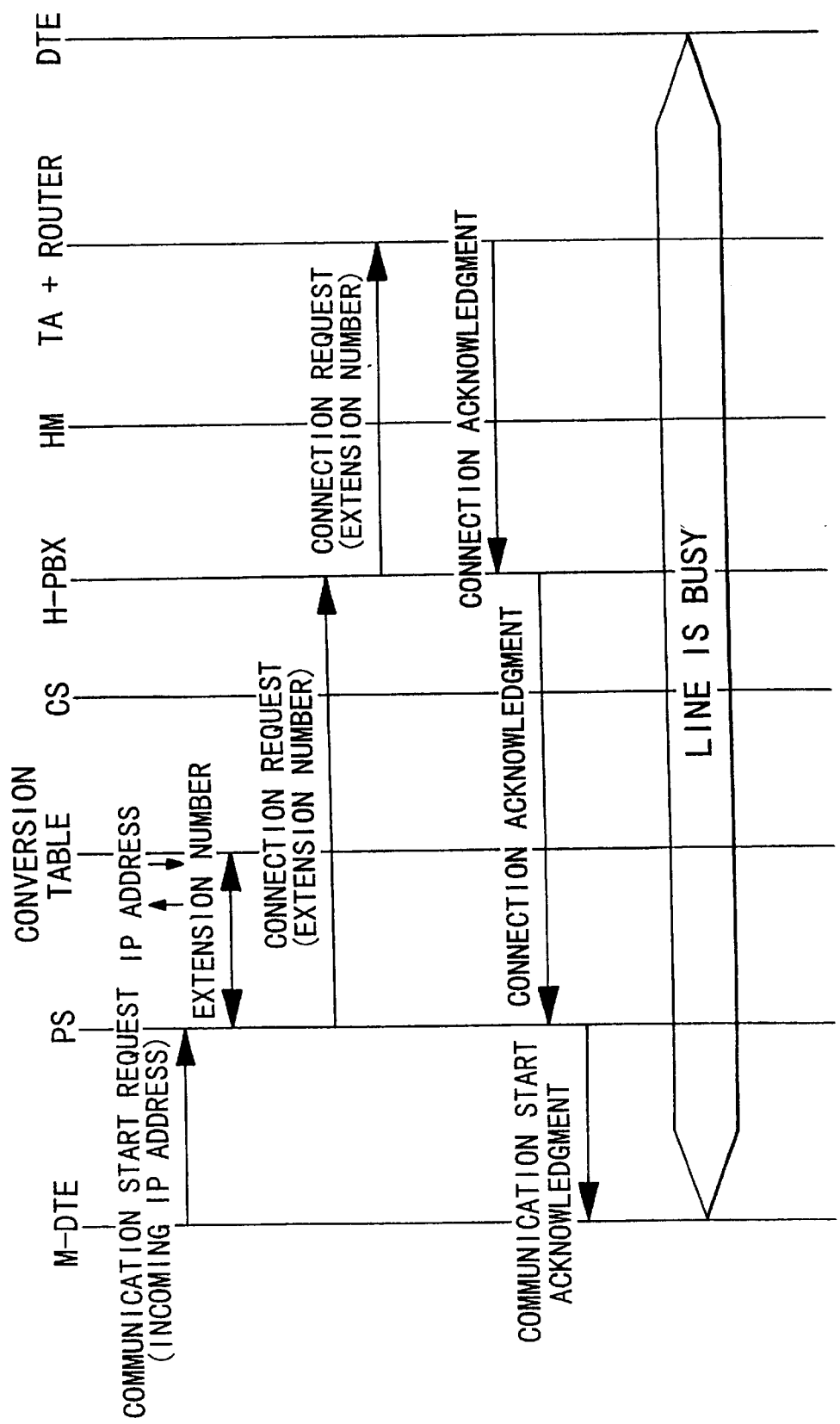
FIG. 7 is a connection sequence diagram showing the operation of the embodiment of FIG. 6.

A connection procedure for sending data from a certain M-DTE to a DTE within the LAN is described first with reference to a connection sequence diagram of FIG. 7. This procedure is different from that of the first embodiment only in the respect that the address conversion table is provided on the PS. The PS converts the incoming IP address to a corresponding extension number using the conversion table and sends a connection request including the extension number as in the case with a voice communication (in this case, no incoming address data may be contained in the conversion table and a connection request including the extension number of the TA may be set unconditionally). The H-PBX receives a connection request from the PS and sends it to the TA. In response to the connection request from the H-PBX, the TA sends a connection acknowledgment and establishes a communication channel between the PS and the TA through the H-PBX. Thereafter, the M-DTE communicates with the DTE through the router connected to the LAN.

2-2-2: In Case One M-DTE Sends Data to Other M-DTE

Figure 8:
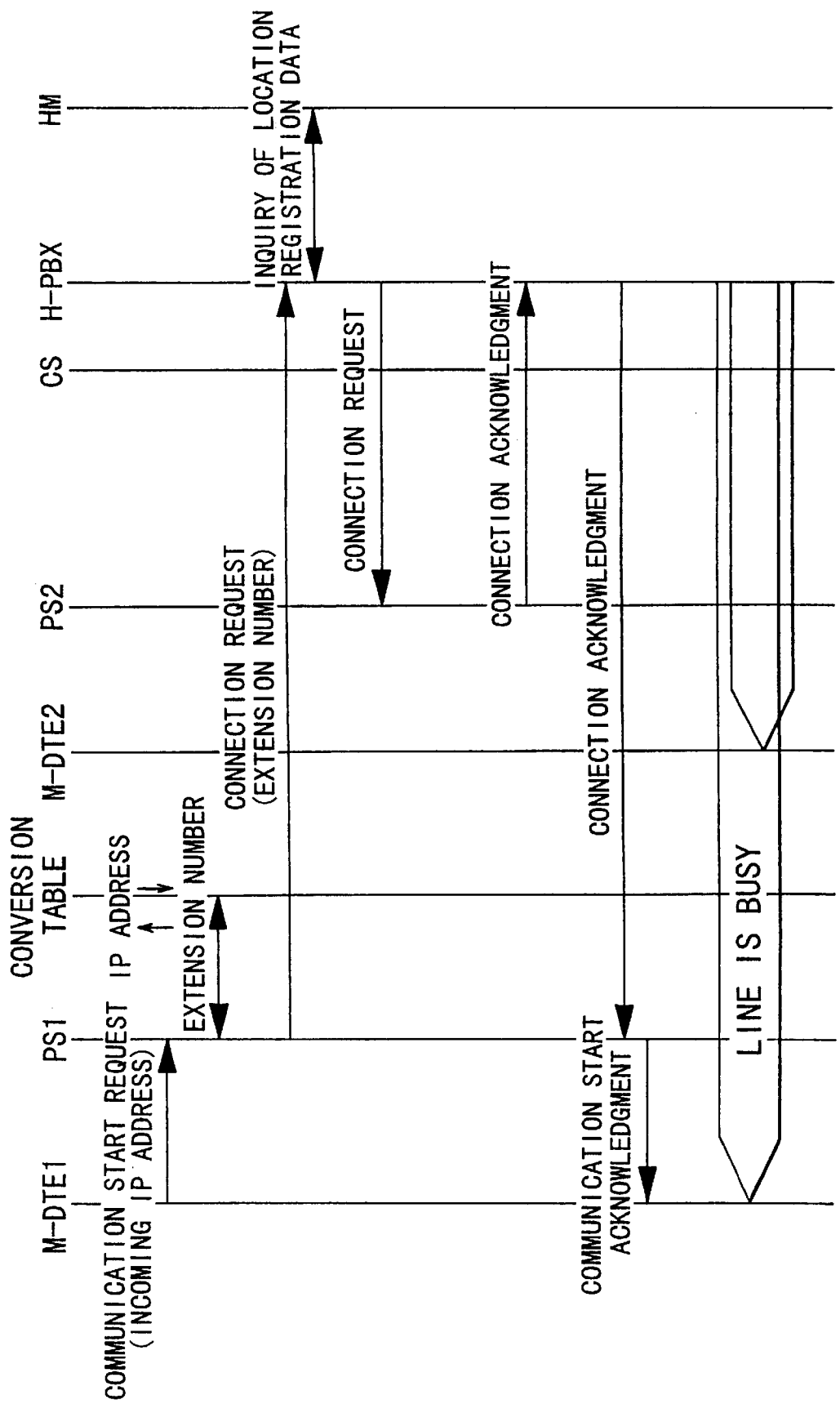
FIG. 8 is a connection sequence diagram showing the operation of the embodiment of FIG. 6.

With reference to FIG. 8, a connection procedure for sending data from one M-DTE to other M-DTE is described next. In this case, after the incoming IP address is converted to an extension number at the PS, the H-PBX accesses a home memory HM within the H-PBX which stores the location registration data and sends a connection request to the PS as the addressee. Thereafter, a connection acknowledgment from the PS as the addressee is sent to the PS as the addresser. As a consequence, a communication channel is established between the PS as the addressee and the PS as the addresser through the PBX. Thereafter, a communication is performed between the first M-DTE and the second M-DTE.

Figure 9:
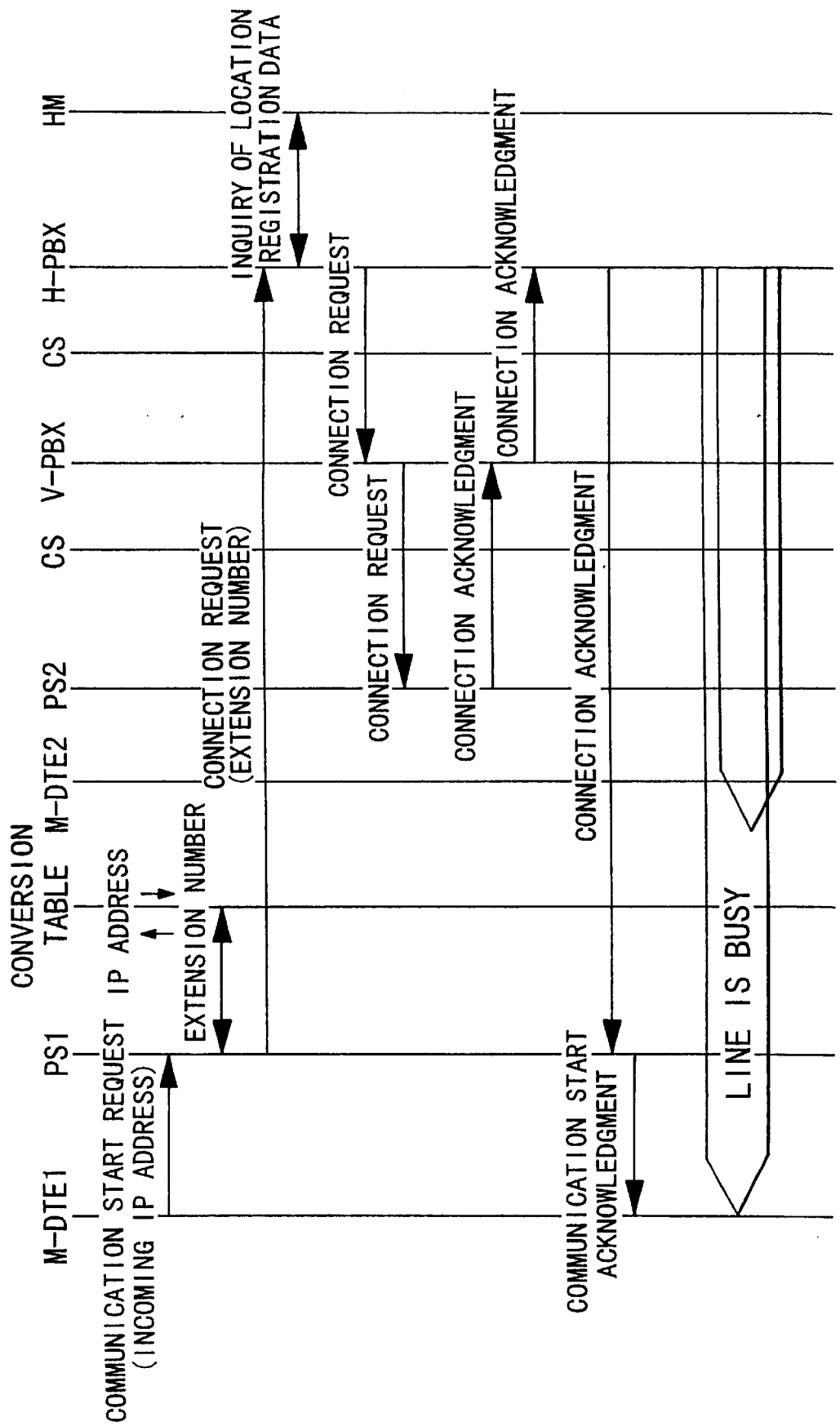
FIG. 9 is a connection sequence diagram showing the operation of the embodiment of FIG. 6.

In case the PS as the addressee is under the control of the V-PBX, the loaming function is used in accordance with a connection sequence of FIG. 9, so that a communication channel is established between the H-PBX and the V-PBX through a multiplex channel.

2-2-3: In Case Data are Sent From DTE to M-DTE

Figure 10:
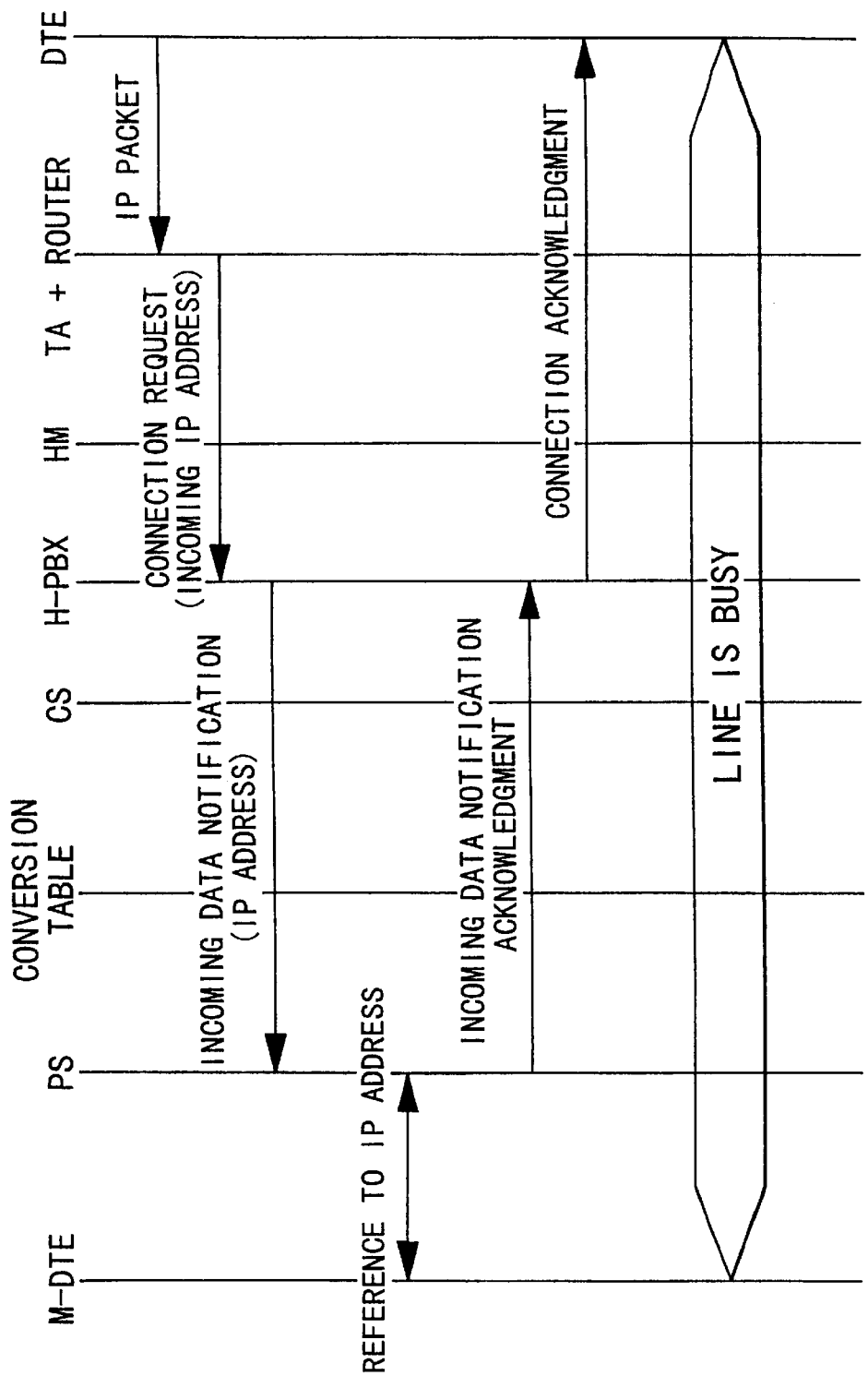
FIG. 10 is a connection sequence diagram showing the operation of the embodiment of FIG. 6.

With reference to a connection sequence diagram of FIG. 10, a connection procedure for sending data from the DTE to the M-DTE is described next. This procedure is different from that of the first embodiment only in the respect that the H-PBX has no conversion table. For this reason, an incoming notification with the use of the incoming IP address is sent from the H-PBX. Upon receipt of the incoming notification, the PS sends an acknowledgment when the incoming IP address therein is in agreement with the IP address of the connected M-DTE and establishes a communication channel between the PS and the TA through the PBX. Thereafter, the DTE communicates with the M-DTE through the router connected to the LAN. In case the PS as the addressee is under the control of the V-PBX, a communication channel is established between the H-PBX and the V-PBX through a multiplex channel, using the loaming function.

3: Third Embodiment

Next, the third embodiment of the present invention is described.

3-1: Configuration of Third Embodiment

Figure 11:
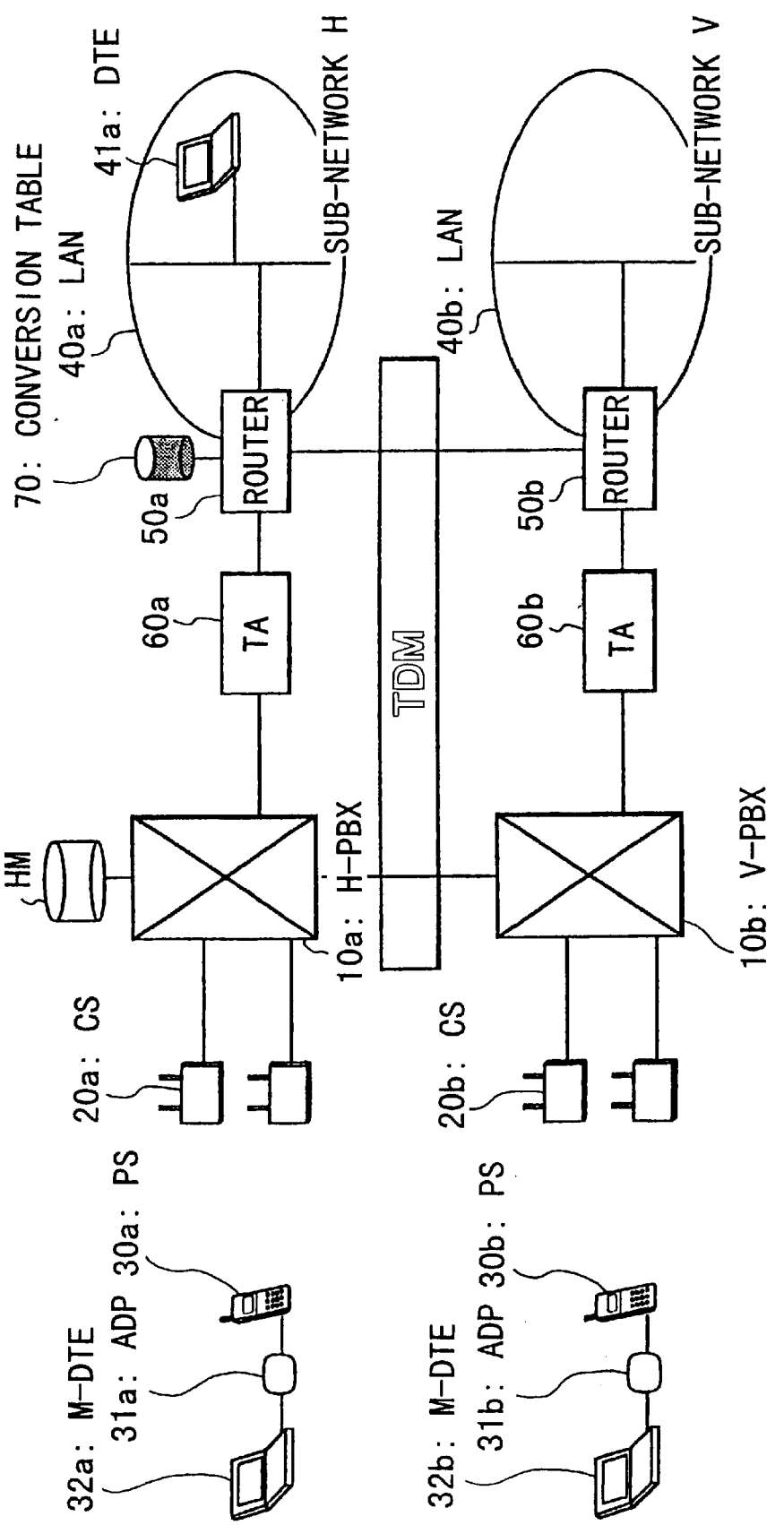
FIG. 11 is a diagram showing a configuration of the third embodiment of the present invention.

FIG. 11 illustrates a configuration of the third embodiment. This embodiment is different from the first embodiment only in the respect that a conversion table for converting the IP address of the addressee to a physical address (extension number) is provided on a router 50a.

3-2: Operation of Third Embodiment

Operation of this embodiment will now be described.

3-2-1: In Case Data are Sent from M-DTE to DTE

Figure 12:
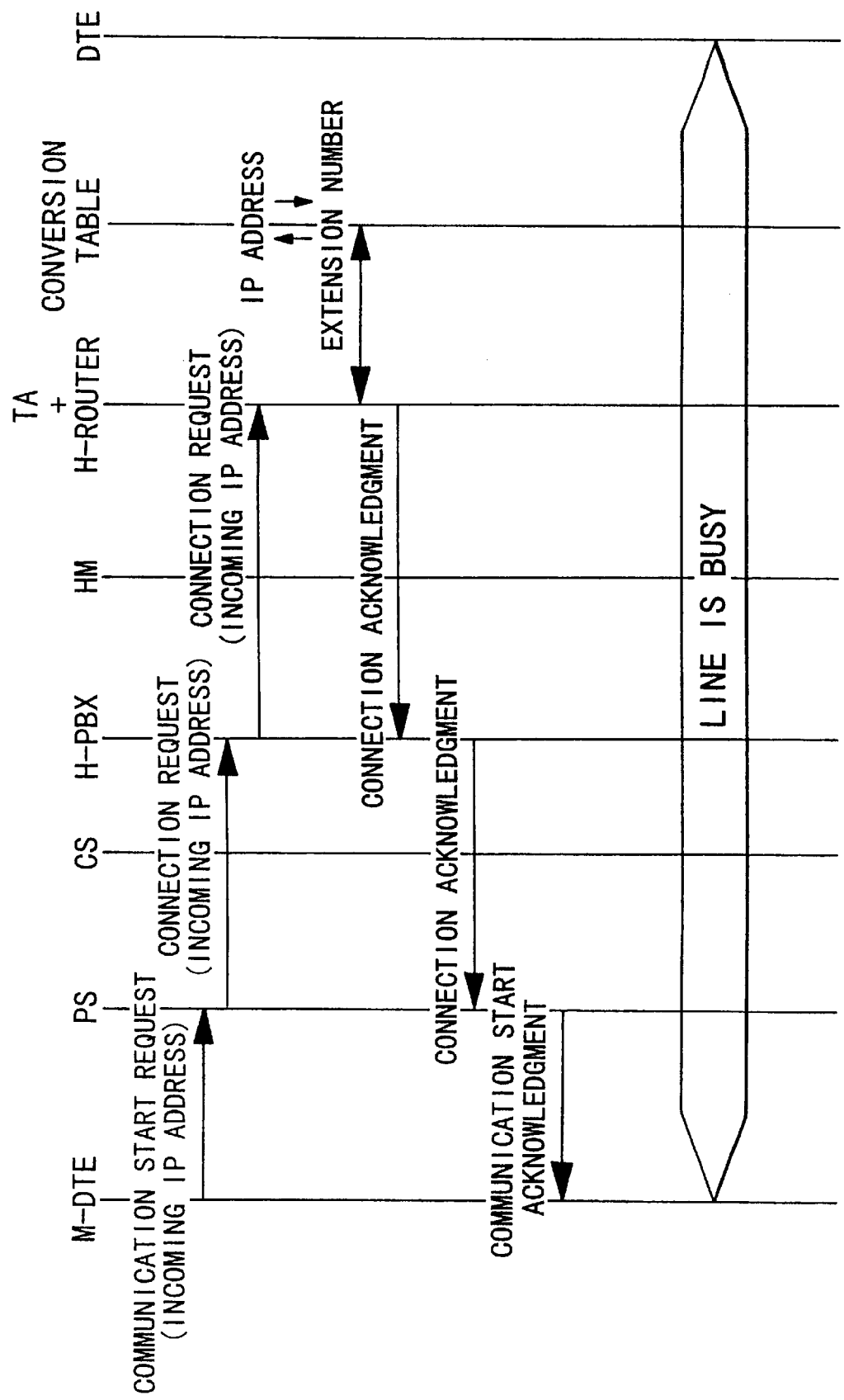
FIG. 12 is a connection sequence diagram showing the operation of the embodiment of FIG. 11.

A connection procedure for sending data from a certain M-DTE to a DTE within the LAN is described with reference to a connection sequence diagram of FIG. 12. This procedure is different from that of the first embodiment only in the respect that the router (H-router) has the address conversion table. The incoming IP address is converted to a corresponding extension number using this conversion table. Further, the data of the extension number corresponding to the incoming IP address of the DTE at that time do not exist on the conversion table. Recognizing that the call is for data communication, the PS sends a connection request designating the IP/extension number conversion connection special number (special number) of the H-PBX as the addressee. At that time, the connection request includes the incoming IP address, so that this request can be distinguished from a connection request for voice communication. The H-PBX receives a connection request from the PS with the special number and sends it to the TA when the H-PBX recognizes it as a call for data communication. At that time, the connection request includes the incoming IP address. In response to the connection request from the H-PBX, the TA searches the conversion table within the H-router and judges that the specific DTE exists on the LAN because no data of the incoming IP address are found. Then, the TA sends a connection acknowledgment to the H-PBX and establishes a communication channel between the PS and the TA through the PBX. Thereafter, the M-DTE communicates with the DTE through the router connected to the LAN.

3-2-2: In Case Data are Sent from One M-DTE to Other M-DTE

Figure 13:
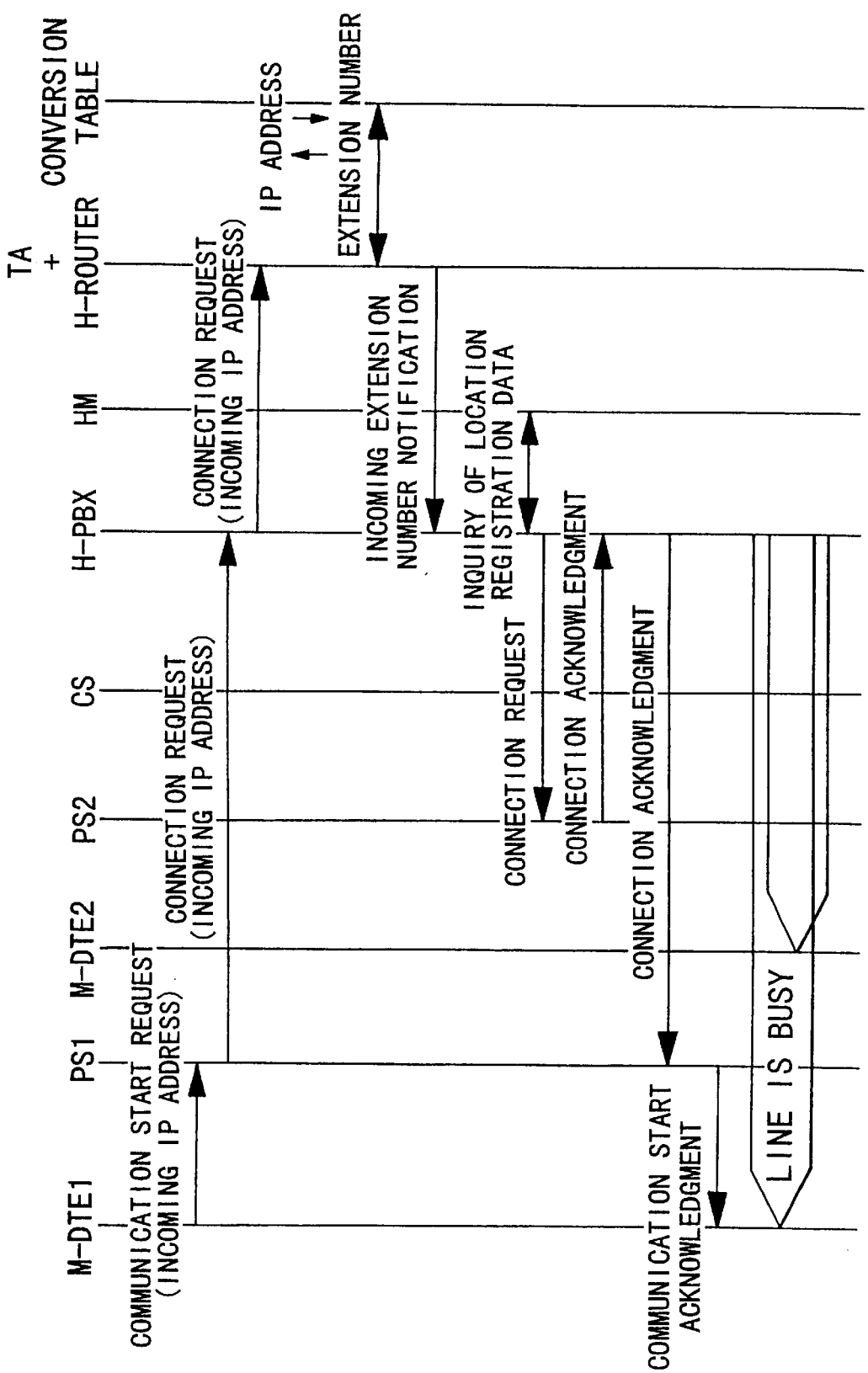
FIG. 13 is a connection sequence diagram showing the operation of the embodiment of FIG. 11.
Figure 14:
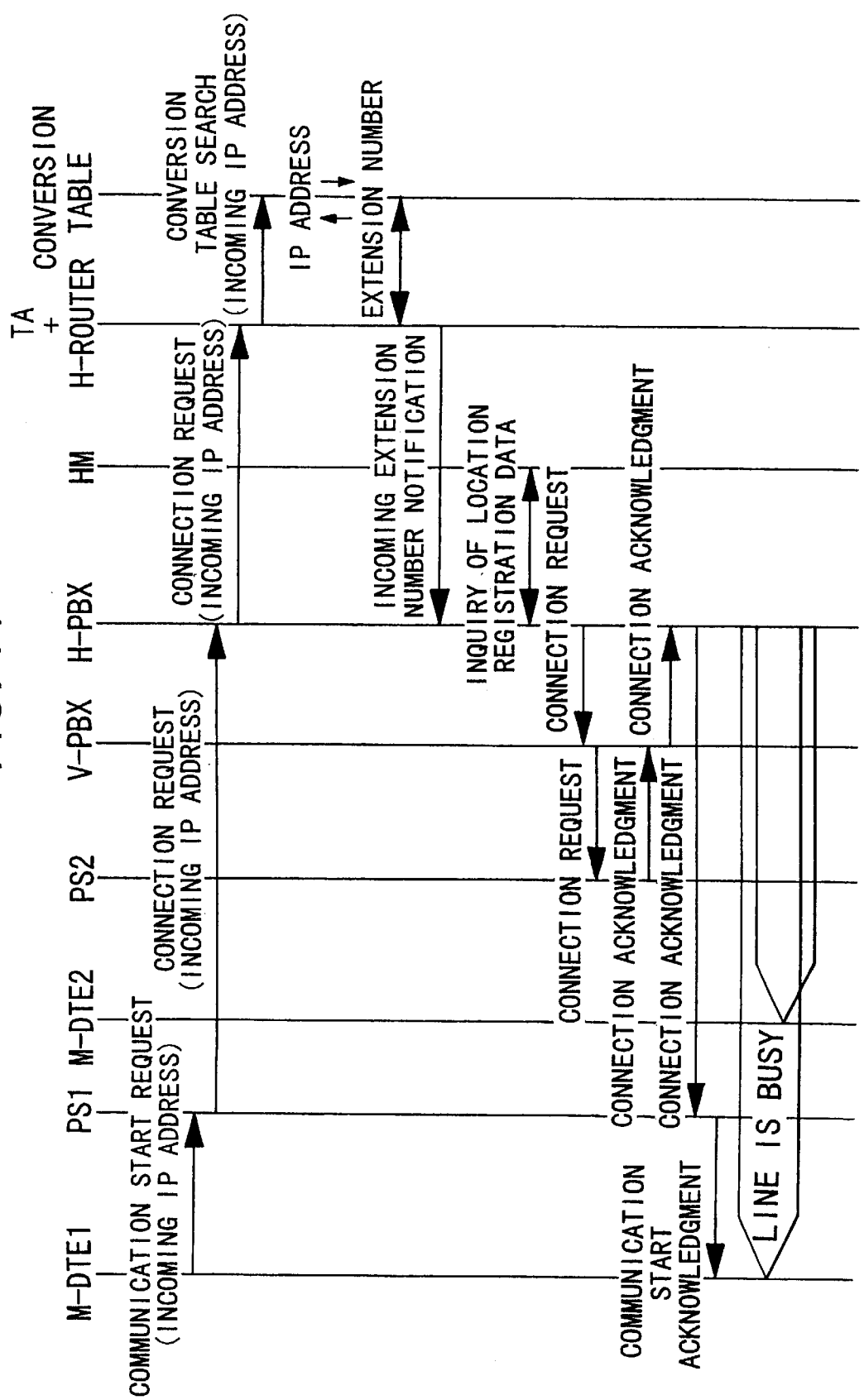
FIG. 14 is a connection sequence diagram showing the operation of the embodiment of FIG. 11.

With reference to FIG. 13, a connection procedure for sending data from one M-DTE to other M-DTE is described next. In this case, after the incoming IP address is converted to an extension number at the PS, the H-PBX accesses a home memory HM within the H-PBX which stores the location registration data and sends a connection request to the PS as the addressee. Thereafter, a connection acknowledgment from the PS as the addressee is sent to the PS as the addresser. As a consequence, a communication channel is established between the PS as the addressee and the PS as the addresser through the PBX. Thereafter, a communication is performed between the first M-DTE and the second M-DTE. In case the PS as the addressee is under the control of the V-PBX, the loaming function is used, so that a communication channel is established between the H-PBX and the V-PBX through a multiplex channel in accordance with a connection sequence of FIG. 14.

3-2-3: In Case Data are Sent From DTE to M-DTE Under Control of H-PBX

Figure 15:
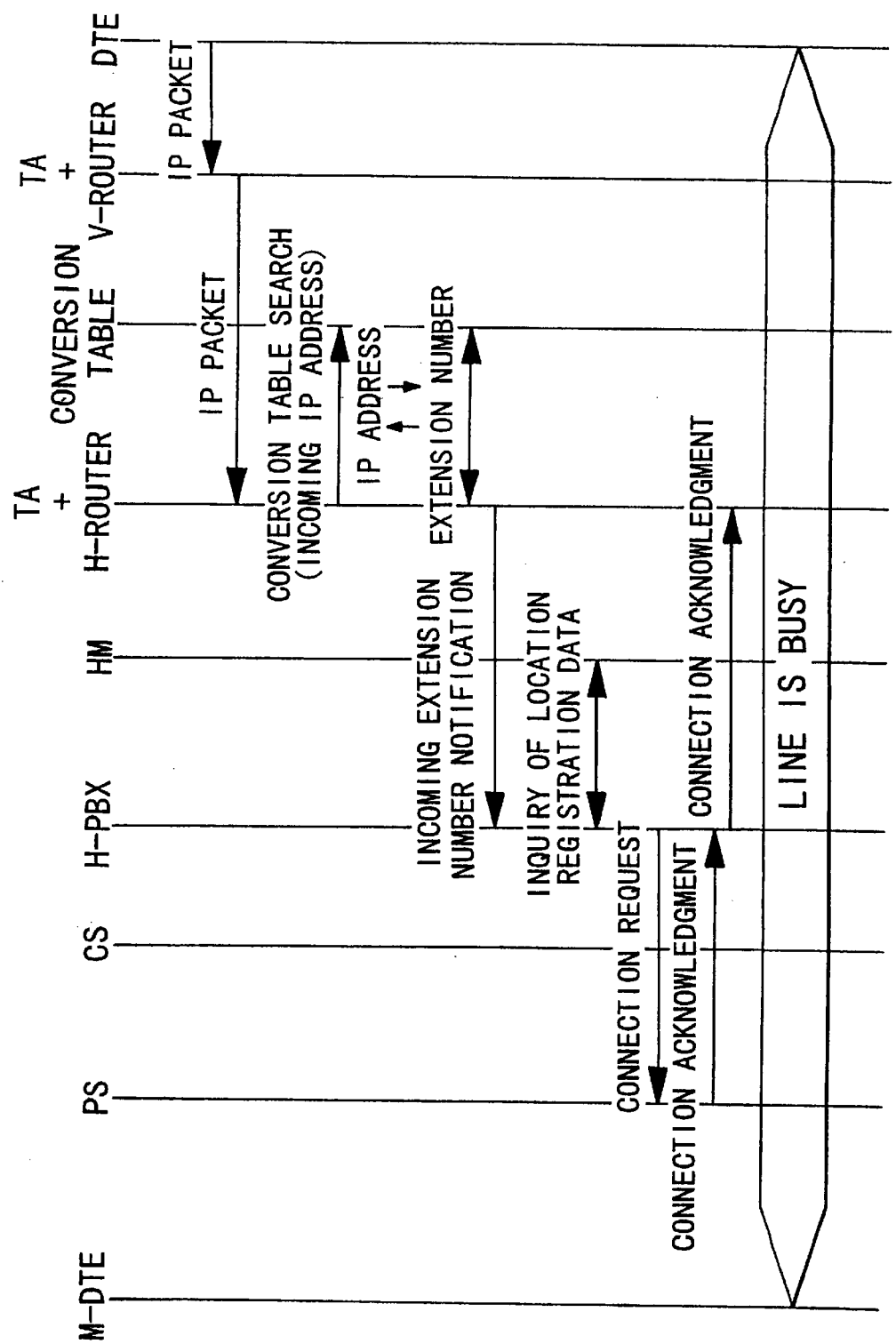
FIG. 15 is a connection sequence diagram showing the operation of the embodiment of FIG. 11.

With reference to a connection sequence diagram of FIG. 15, a connection procedure for sending data from the DTE to the M-DTE under the control of the H-PBX is described next. In this case, the IP packet is transmitted to the H-router no matter what network the DTE is visiting. Upon receipt of the packet from the DTE, the H-router converts the IP address to an incoming extension number using the conversion table within the H-router and performs a communication by making an incoming call from the TA to the M-DTE.

Figure 16:
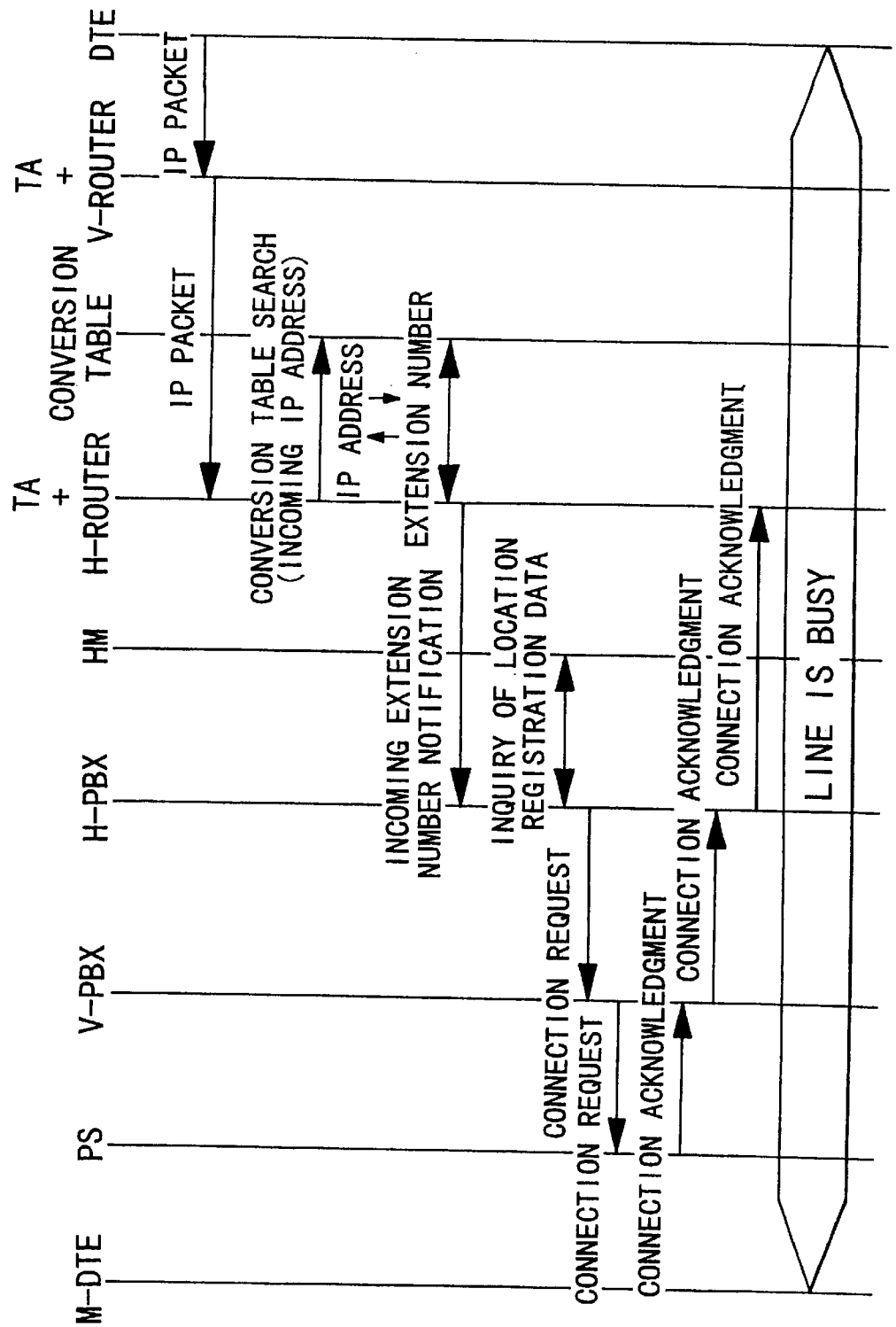
FIG. 16 is a connection sequence diagram showing the operation of the embodiment of FIG. 11.

In case the M-DTE is under the control of the V-PBX, a communication is performed by making an incoming call from the H-router to the M-DTE in according with a connection sequence of FIG. 16, using the loaming function of the H-PBX.

4: Other Embodiments

The present invention has been described in the form of one embodiment in which the invention is applied to an in-house communication system having a wireless PBX system connected to the LAN. As a wireless access method and a duplex method of the wireless PBX system, TDMA and TDD are employed, respectively (reference documents: "Second Generation Cordless Telephone System, Standard Specifications, first issue (revision-1), RCR STD-28", Old Juridical Foundation Wave System Development Center (New Name: Wave Industrial Society). In the alternative, other wireless access methods such as CDMA, and other duplex method such as FDD may be employed. Further, by connecting the PBX within the wireless PBX system to other networks such as general public network (PSTN/ISDN), mobile network (cellular network, public PHS network, radio paging, and the like), connectionless type network, and the like, a communication can be performed between a data communication terminal equipment under the control of the network and a data communication terminal equipment under the control of the wireless PBX system.

We claim:

1. A mobile wireless data communications system comprising a wireless personal station assigned with a telephone number in accordance with a single telephone number scheme, a wireless connection equipment for performing a wireless connection with said wireless personal station, an exchange for controlling said wireless connection equipment, a control unit connected to said exchange and adapted to perform a transmission control of packet data through said LAN, and a terminal equipment connected to said LAN and assigned with a packet address independent of said telephone number scheme; said exchange performing a routing based on the telephone number; said control unit performing a transmission control of the packet data based on the packet address; characterized in that said exchange has a correspondence table in which the packet address is made correspond to the telephone number, and the packet address is converted to the telephone number based on said correspondence table in order to establish a communication channel between said wireless personal station and said terminal equipment connected to said LAN.

2. A mobile wireless data communications system comprising a wireless personal station assigned with a telephone number in accordance with a single telephone number scheme, a wireless connection equipment for performing a wireless connection with said wireless personal station, an exchange for controlling said wireless connection equipment, a control unit connected to said exchange and adapted to perform a transmission control of packet data through said LAN, and a terminal equipment connected to said LAN and assigned with a packet address independent of said telephone number scheme; said exchange performing a routing based on the telephone number; said control unit performing a transmission control of the packet data based on the packet address; characterized in that said wireless personal station has a correspondence table in which the packet address is made correspond to the telephone number, and converts the packet address to the telephone number based on said correspondence table in order to establish a communication channel between said wireless personal station and said terminal equipment connected to said LAN.

3. A mobile wireless data communications system comprising a wireless personal station assigned with a telephone number in accordance with a single telephone number scheme, a wireless connection equipment for performing a wireless connection with said wireless personal station, an exchange for controlling said wireless connection equipment, a control unit connected to said exchange and adapted to perform a transmission control of packet data through said LAN, and a terminal equipment connected to said LAN and assigned with a packet address independent of the telephone number scheme; said exchange performing a routing based on said telephone number; said control unit performing a transmission control of the packet data based on the packet address; characterized in that said control unit has a correspondence table in which the packet address is made correspond to the telephone number, and converts the packet address to the telephone number based on said correspondence table in order to establish a communication channel between said wireless personal station and said terminal equipment connected to said LAN.

4. A mobile wireless data communications system comprising a plurality of systems each comprising a wireless personal station assigned with a telephone number in accordance with a single telephone number scheme, a wireless connection equipment for performing a wireless connection with said wireless personal station, an exchange for controlling said wireless connection equipment, a control unit connected to said exchange and adapted to perform a transmission control of packet data through said LAN, and a terminal equipment connected to said LAN and assigned with a packet address independent of the telephone number scheme; said exchange performing a routing based on the telephone number; said control unit performing a transmission control of the packet data based on the packet address; characterized in that said exchanges of said systems are connected together and said control units of said systems are also connected together, said wireless personal station of each system is capable of communicating with a control unit in a desired system through a wireless connection equipment and an exchange not only within its own system but also within other system, and said exchange has a correspondence table in which the packet address is made correspond to the telephone number, and the packet address is converted to the telephone number based on said correspondence table in order to establish a communication channel between said wireless personal station and said terminal equipment connected to said LAN.

5. A mobile wireless data communications system comprising a plurality of systems each comprising a wireless personal station assigned with a telephone number in accordance with a single telephone number scheme, a wireless connection equipment for performing a wireless connection with said wireless personal station, an exchange for controlling said wireless connection equipment, a control unit connected to said exchange and adapted to perform a transmission control of packet data through said LAN, and a terminal equipment connected to said LAN and assigned with a packet address independent of the telephone number scheme; said exchange performing a routing based on the telephone number; said control unit performing a transmission control of the packet data based on the packet address; characterized in that said exchanges of said systems are connected together and said control units of said systems are also connected together, said wireless personal station of each system is capable of communicating with a control unit in a desired system through a wireless connection equipment and an exchange not only within its own system but also within other system, and said wireless personal station has a correspondence table in which the packet address is made correspond to the telephone number, and converts the packet address to the telephone number based on said correspondence table in order to establish a communication channel between the wireless personal station and said terminal equipment connected to said LAN.

6. A mobile wireless data communications system comprising a plurality of systems each comprising a wireless personal station assigned with a telephone number in accordance with a single telephone number scheme, a wireless connection equipment for performing a wireless connection with said wireless personal station, an exchange for controlling said wireless connection equipment, a control unit connected to said exchange and adapted to perform a transmission control of packet data through said LAN, and a terminal equipment connected to said LAN and assigned with a packet address independent of the telephone number scheme; said exchange performing a routing based on the telephone number; said control unit performing a transmission control of the packet data based on the packet address; characterized in that said exchanges of said systems are connected together and said control units of said systems are also connected together, said wireless personal station of each system is capable of communicating with a control unit in a desired system through a wireless connection equipment and an exchange not only within its own system but also within other system, and said control unit has a correspondence table in which the packet address is made correspond to the telephone number, and converts the packet address to the telephone number based on said correspondence table in order to establish a communication channel between said wireless personal station and said terminal equipment connected to said LAN.

\* \* \* \* \*

UNITED STATES PATENT AND TRADEMARK OFFICE
CERTIFICATE OF CORRECTION

PATENT NO. : 6,009,088
DATED : December 28, 1999
INVENTOR(S) : T. Taguchi et al.

It is certified that error appears in the above-identified patent and that said Letters Patent is hereby corrected as shown below:

<u>Title page,</u>
<u>Column 2,</u>
After line 1, under "U.S. PATENT DOCUMENTS", please insert the following:

-- FOREIGN PATENT DOCUMENTS

| | | |
|---|---|---|
| 4-227149 | 08/1992 | Japan |
| 5-204797 | 08/1993 | Japan |
| 7-221773 | 08/1995 | Japan |
| 5-207072 | 08/1993 | Japan |
| 5-344161 | 12/1993 | Japan |
| 6-029988 | 02/1994 | Japan --. |

Under "*Attorney, Agent, or Firm*", please change "Rogers & Wells LLP" to -- Brinks Hofer Gilson & Lione --.

<u>Claims 1, 2, and 3,</u>
Line 16, please insert -- to -- after "made".

<u>Claims 4, 5, and 6,</u>
Line 25, please insert -- to -- after "made".

Signed and Sealed this

Twenty-fifth Day of September, 2001

Attest:

NICHOLAS P. GODICI
*Attesting Officer*   *Acting Director of the United States Patent and Trademark Office*